Patented Mar. 15, 1927.

1,621,094

UNITED STATES PATENT OFFICE.

ERNEST H. VOLWILER, OF CHICAGO, ILLINOIS, ASSIGNOR TO ABBOTT LABORATORIES, OF CHICAGO, ILLINOIS, A CORPORATION OF ILLINOIS.

N-BUTYL ETHYL BARBITURIC SUBSTANCE.

No Drawing.   Application filed July 18, 1923.  Serial No. 652,454.

My invention relates to the production of n-butyl ethyl barbituric substances which are of particular value as hypnotics.

These new hypnotic compounds may be represented by the formula:

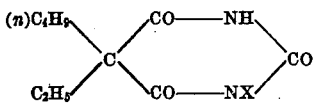

where, in the case of the acid, X represents hydrogen, or in the case of the organic salt X represents H plus the organic basic radical, or in the case of the inorganic salts X represents the inorganic basic radical, for example, a metal.

The organic salts are represented by the formula:

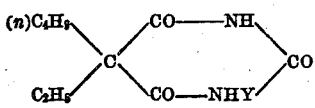

where Y is an organic basic radical.

These new compounds possess remarkable hypnotic action, producing sleep in small doses and having a relatively low toxicity.

The acid, n-butyl-ethyl barbituric acid, may be produced by any of the ordinary methods for preparing 5, 5-disubstituted barbituric acids. For example, 107 grams n-butyl-ethyl malonic ethyl-ester and 38 grams urea are added to a solution of 30.1 grams sodium in 567 grams absolute alcohol, and heated in an autoclave at 105° for five hours. The alcohol is then distilled off, the residue taken up in water, and acidified with a mineral acid, whereupon the crude n-butyl-ethyl barbituric acid separates out. Upon recrystallization from dilute alcohol, it exists as a white solid, melting at 126–127° C. It is very slightly soluble in water, but readily soluble in alcohol, ether, etc.

The organic salts may be prepared by treating the acid with the organic base and warming, whereupon the salt is readily formed and on cooling usually crystallizes from the solution. In many cases the salt is soluble in water.

*Specific examples of the organic salts.* n-butyl-ethyl-barbiturate of di-ethyl amine. 21.6 grams of n-butyl-ethyl-barbituric acid are mixed with 10.5 grams of diethyl amine; the mixture becomes warm as the n-butyl-ethyl-barbituric acid dissolves. It is warmed to 70° C. for an hour, and upon cooling the product crystallizes. After allowing the excess amine to evaporate off, the material melts at about 60° C. It is readily soluble in water and alcohol, less so in ether, and insoluble in ligroin.

n-butyl-ethyl-barbiturate of di-n-butyl amine. 21.2 grams of n-butyl-ethyl-barbituric acid are warmed with 15 grams di-n-butyl amine to 70° C. for an hour. After removing the excess di-n-butyl amine by warming in vacuo, the crystalline solid obtained on cooling melts at about 70° C. It is only slightly soluble in water, but more soluble in alcohol.

Ammonium n-butyl ethyl barbiturate. The ammonium salt of n-butyl-ethyl-barbituric acid may be prepared in solution by dissolving the n-butyl-ethyl barbituric acid in a slight excess of concentrated aqueous ammonia solution.

*The inorganic salts.*

These salts of n-butyl-ethyl-barbituric acid are prepared in the usual manner, by treating the acid with the inorganic basic radical. The sodium and potassium salts dissolve readily in water, but the calcium salt is insoluble in water.

These new inorganic salts of n-butyl-ethyl-barbituric acid have a slightly bitter ammonia-like taste.

These salts are claimed in my copending application Serial No. 591,052.

The scope of the invention should be determined by reference to the appended claim, said claim being construed as broadly as possible, consistent with the state of the art.

I claim as my invention:

The new hypnotic substance formed by the reaction of n-butyl-ethyl barbituric acid with diethyl-amine, which is a white solid, melting at about 60° C., being soluble in water and having an ammonia-like and slightly bitter taste.

ERNEST H. VOLWILER.